Richard E. Merrill
Donald B. Rising
INVENTORS

Aug. 2, 1966 R. E. MERRILL ETAL 3,264,132
METHOD FOR APPLYING METALLIC FLAKE MATERIAL TO A SUBSTRATE
Filed Feb. 6, 1962 3 Sheets-Sheet 2

Richard E. Merrill
Donald B. Rising
*INVENTORS*

BY
Attorney

Richard E. Merrill
Donald B. Rising
INVENTORS

United States Patent Office 3,264,132
Patented August 2, 1966

3,264,132
METHOD FOR APPLYING METALLIC FLAKE
MATERIAL TO A SUBSTRATE
Richard E. Merrill, Wakefield, and Donald B. Rising, Stow, Mass., assignors to Arthur D. Little, Inc., Cambridge, Mass., a corporation of Massachusetts
Filed Feb. 6, 1962, Ser. No. 171,792
1 Claim. (Cl. 117—31)

This invention relates to a method for making a metalized coated surface and more particularly to a method and apparatus for the deposition of finely divided metallic material on a glossy thermoplastic surface and the subsequent bonding of the material thereto.

In application Serial Number 839,582 filed September 14, 1959, for Surface Coating With Metallic Powder and the Like in the name of Mark S. Eaton, now U.S. Patent 3,085,025 and assigned to the same assignee as this application, there is described a method of making a metalized coating which results in the production of a superior metallic-coated substrate. The method disclosed by Eaton involves the deposition of finely divided metallic particles on a glossy thermoplastic film while it is in its normal non-tacky solid condition in such a manner that from 10 to 100% of the thermoplastic film surface is covered with the metallic material. After deposition of the metallic material the thermoplastic film is converted by heat to a highly viscous state which supports the metallic particles and bonds them to its surface. Subsequently, the thermoplastic film is returned to its normal non-tacky solid condition to give a brilliantly coated surface.

In application Serial Number 10,839 filed February 25, 1960, for Coated Surface and Process for Making Same in the names of Walter J. Cairns and Richard E. Merrill, now abandoned, and assigned to the same assignee as this application, there is described a method which is an improvement over the basic method of Eaton and which is characterized by the step of calendering the metalized paper under certain specified conditions. The coated substrates resulting from these methods described in Serial Number 839,582 and Serial Number 10,839 are particularly pleasing to the eye because of their extremely brilliant characteristics, a result which is due to the fact that a portion of the glossy thermoplastic film remains uncovered. When the coating is observed by the eye this glossy uncovered surface is integrated with the metallic particles to give the brilliant effect. In order to create a surface of this character it is necessary to deposit the metallic material, preferably in flake form, so that a portion of the glossy thermoplastic surface remains uncovered, and so that the metallic material is present on the surface in single particle layers. This means that essentially none of the metallic particles overlap and that there is little contact among particles edges. Any other arrangement of the particles on the glossy thermoplastic surface detracts from its appearance and increases particle rub-off.

The present invention is particularly concerned with a unique method for depositing the finely divided metallic material onto the glossy thermoplastic surface to achieve the required type of deposition prior to the bonding of the particles to the surface through heat; and with method and apparatus which incorporate this deposition technique and which make possible production of the finished coated papers at a rapid rate.

The method of this invention is particularly applicable to the use of flake-like materials, normally sized 325-mesh and smaller. It will be described in detail in terms of metallic flake particles, but is, of course, applicable to any suitable particulate material.

It is therefore a primary object of this invention to provide a method for depositing finely divided particulate material in flake form onto a glossy thermoplastic surface such that the flakes are deposited in an essentially single layered condition and do not completely cover the entire surface. It is another object of this invention to provide a method of the character described which may be used to make metalized coatings to obtain extremely shiny surfaces. An additional object of this invention is to provide an economical method of depositing metalized particles such that little, if any, excess of the particles must be removed, thus eliminating waste and the step of excess removal.

It is another primary object of this invention to provide apparatus suitable for applying finely divided particulate matter to a glossy thermoplastic surface in a manner such that the particulate matter is uniformly distributed over the surface in a single-layered condition. It is yet another object to provide apparatus of the character described which eliminates the need for removing any excess of the particulate matter. Other objects of the invention will in part be obvious and will in part be apparent hereinafter.

The invention accordingly comprises the several steps and the relation of one or more such steps with respect to each of the others, and the apparatus embodying features of construction, combinations of elements and arrangement of parts which are exemplified in the following disclosure. The scope of the invention will be indicated in the claims.

The method of depositing finely divided flake material onto a glossy film surface in accordance with this invention comprises the steps of uniformly distributing a controlled amount of the finely divided flake material onto a pick-up roll; transferring the flake material from the pick-up roll through at least one spreading roll to a printing roll; contacting the printing roll with the film surface thereby to apply the flake material uniformly over the film surface to the extent that from about 10% to about 98% of the film surface is covered; and buffing the resulting flake-covered film whereby substantially all of the flakes contact the film through their maximum surface area and form a single layer of flakes on the surface.

Our apparatus for depositing the finely divided flake material onto a glossy film surface comprises a pick-up roll; means for uniformly distributing the finely divided flake material onto the pick-up roll; a printing roll adapted to receive the flake material from the pick-up roll; supply means adapted to continuously furnish a substrate carrying the film and to contact the film with the printing roll; first and second buffing means adapted to orient the flakes on the film to achieve maximum contact therebetween; means for rotating the printing roll at a peripheral speed substantially equal to the forward linear speed of the substrate; means for rotating the first buffing means in a direction opposed to the direction of the substrate travel and at a speed less than that of the substrate travel; and means for rotating the second buffing means in the same direction of the substrate travel and at a speed greater than that of the substrate travel.

For a fuller understanding of the nature and objects of the invention reference should be had to the following detailed description taken in connection with the accompanying drawings in which—

By the process and apparatus of this invention it is possible to apply finely divided flake metallic powder to the surface of a glossy, thermoplastic film without the use of any type of carrying vehicle and in such a manner that the amount of metallic flake material is controlled to the degree that it is not necessary to remove any excess. Moreover the apparatus of this invention permits the entire coating process to be accomplished at rapid speeds comparable to conventional coating speeds which range from 300 to 500 feet per minute. The application of the metallic flake material is achieved through a unique feeding channel combined with the use of a series of rolls as will be described in detail below in conjunction with FIG. 2.

Figure 1:
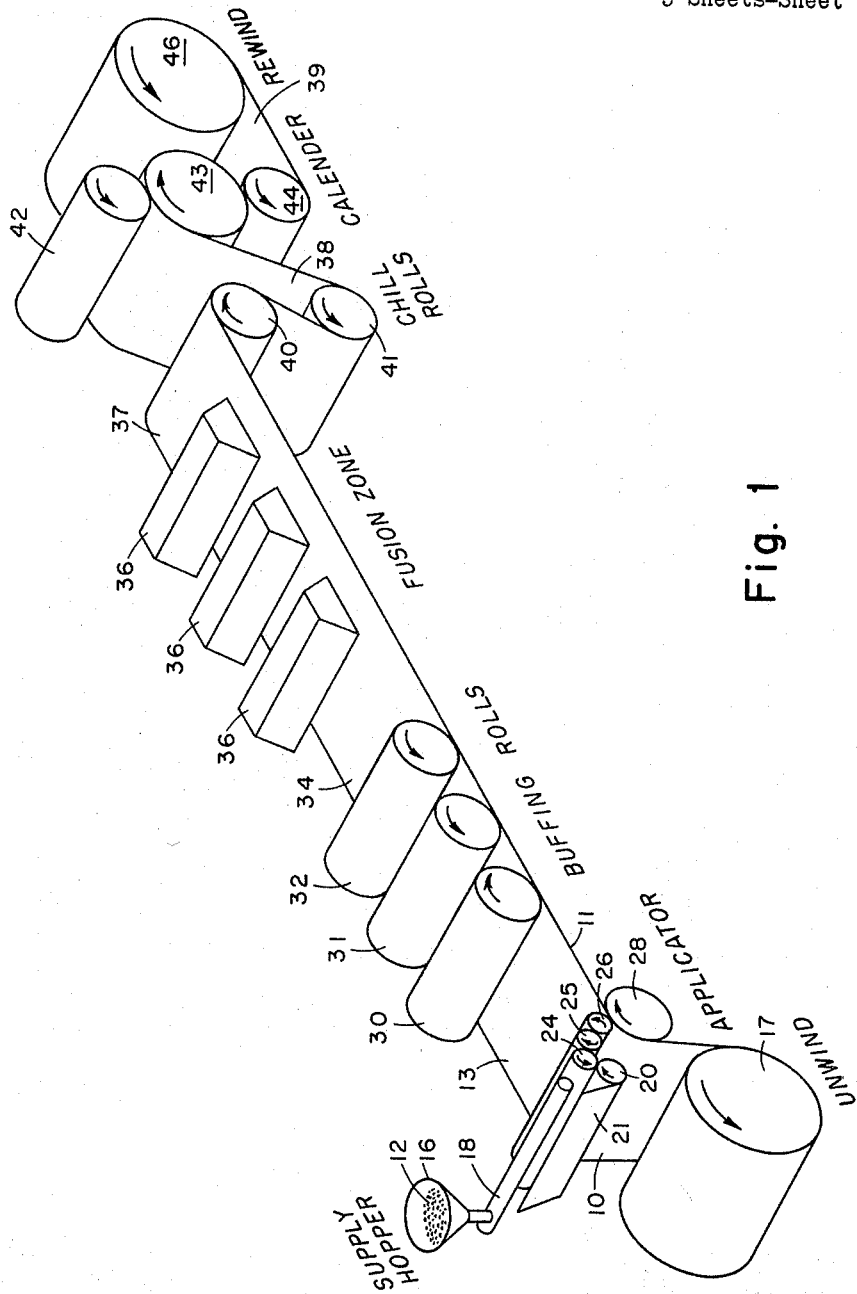
FIG. 1 is a schematic representation of the entire apparatus of the invention.

Turning now to the schematic representation of the overall apparatus of FIG. 1 it will be seen that the application of a metallic coating to a substrate may be carried out rapidly by means of a continuous process. In FIG. 1 the thermoplastic film 10 is affixed to a substrate 11 such as paper. The thermoplastic coated substrate is supplied from a supply roller 17 and the finely divided particulate matter 12 is furnished from a supply reservoir 16 which in FIG. 1 takes the form of a hopper. The flake material (which will be assumed for illustration in the following description to be aluminum flakes sized 325-mesh or finer) is fed from hopper 16 into a feed channel 18 which evenly distributes the aluminum flakes into a trough formed between a rubber pick-up roll 20 and a backing plate 21 used in conjunction with the pick-up roll 20. This feed channel will be described in detail below with reference to FIGS. 3 and 4. The speed at which the pick-up roll 20 is operated is used to control the amount of flake material deposited and generally the peripheral speed of the pick-up roll 20 will be less than the forward speed of the coated substrate. The direction of rotation of pick-up roll 20 is opposed to the forward direction of the coated substrate.

Operating in conjunction with the pick-up roll 20 are spreading rolls 24 and 25 and a printing roll 26. The direction of rotation of the various rolls indicated by the arrows and the peripheral speed of rolls 24, 25 and 26 is essentially equivalent to the forward linear speed of the thermoplastic-coated substrate 11. These rolls, as well as pick-up roll 20, are preferably formed (at least on their surfaces) of a soft, rubbery material such as natural rubber.

As the thermoplastic-coated paper is passed between printing roll 26 and the nip roll 28, it receives from printing roll 26 a controlled amount of the flaked particulate matter. The flow of this particulate matter is so adjusted as to furnish just enough aluminum flake material to partially cover the thermoplastic film surface. The extent of coverage is determined by the characteristics desired in the end product and should range from about 10% to slightly less than complete coverage, e.g., about 98%.

Figure 2:
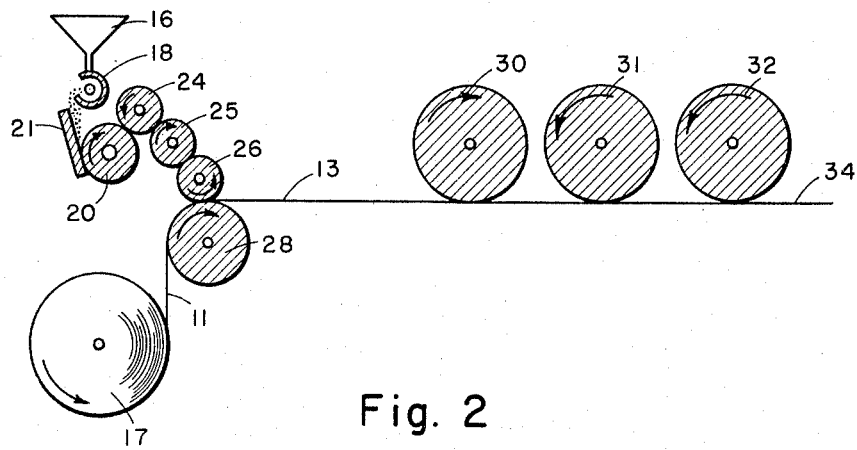
FIG. 2 is a cross-sectional view of that portion of the apparatus which is used for applying the particulate matter to the thermoplastic surface.
Figure 3:
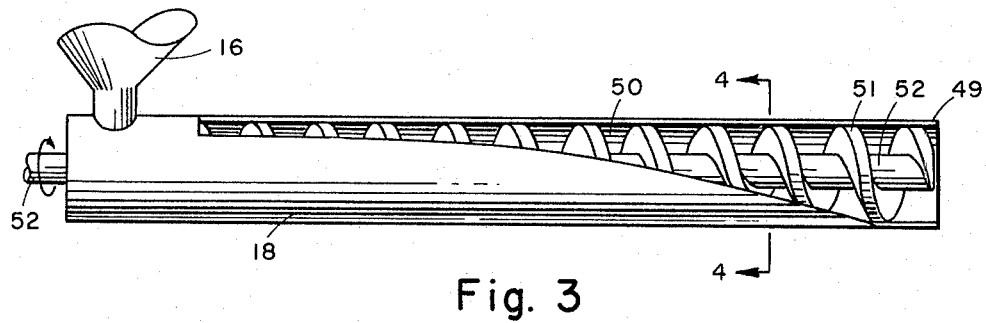
FIG. 3 is a side elevational view of the feed channel used to handle the fine flaked material.
Figure 4:
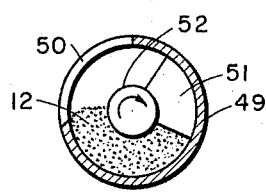
FIG. 4 is a cross-sectional view of the feed channel of FIG. 3 taken through section 4—4 of that figure.

Control of the flow of the particulate matter is also achieved through the use of the feed channel 18, illustrated in detail in FIGS. 3 and 4. This feed channel comprises a cylindrical tube 49 closed at its terminal end and having the supply reservoir 16 at the opposite delivery end. A slot opening 50 is cut in the tube 49 in such a manner that the width of the opening continuously increases from the delivery to the terminal end of the tube. Alternatively, the width of the slot opening may be constant and the slot contoured to follow a curve such as that shown by the curved side of the slot of FIG. 3. Within the tube 49 is a screw 51 having a shaft 52 which is rotated by any suitable manner (not shown) in the direction shown. The flaked material delivered to the feed channel from supply reservoir 16 (flowing as if it were a liquid) is pushed along the tube by the flutes of the screw and is confined by these flutes and by the wall of the tube. Where the wall is made progressively lower a portion of the charge of flaked material is no longer confined and it therefore spills out of the tube onto the pick-up roll 20 (see FIG. 2). The amount of flaked material thus fed to pick-up roll 20 at any given point depends upon the difference in elevation of that point relative to the point immediately upstream. Thus the feeding of the flaked material to pick-up roll 20 and hence ultimately to the thermoplastic film surface is controlled by the shape of the slot opening, and by the speed at which the screw 51 is rotated relative to the peripheral speed of pick-up roll 20.

The remaining portion of the apparatus of FIG. 1 may now be described. Because flake material is being handled it is necessary in order to form the most permanent type of bond to lay substantially each flake particle in a horizontal position with respect to its greatest dimension. This is the function performed by the buffing rolls 30, 31 and 32. After printing roll 26 applies the aluminum flakes to the thermoplastic surface the aluminum-coated material 13 is passed in contact with a series of buffing rolls having a soft surface. Thus they may be covered with sheepskin, cotton string, and the like. In the apparatus of FIGS. 1 and 2, three buffing rolls are illustrated. The first or forward buffing roll 30 turns in a direction opposite to that of the direction of travel of the paper. This buffing roll 30 should have a peripheral speed which is less than the forward speed of the paper. The two after buffing rolls 31 and 32 are rotated in the same direction but at a faster speed than the paper. Typical speeds will be illustrated in the example given below.

The pressure which is applied to the rolls during buffing depends upon the character of the coating on the substrate and can be determined experimentally for each material to be metalized.

In addition to causing the aluminum flakes to lie flat, the buffing rolls also insure that the surface of the thermoplastic film is coated with, or contacted with, a single layer of the metallic flakes. Thus each individual flake is so handled as to contact substantially the maximum area possible with the thermoplastic film and thus achieve the required essentially complete and permanent bonding of the flakes to the film. This, in turn, means the elimination of essentially all rub-off because only those metal particles which are adjacent to the thermoplastic resin surface over a maximum area are bonded in place during the fusion portion and because essentially all of the aluminum flakes are so positioned.

The buffing step may be accomplished with only two buffing rolls such as 30 and 31 or with more than the three shown so long as these buffing rolls orient the flaked material to contact the thermoplastic film through essentially the maximum area and permit the single-layered flakes to remain substantially uniformly distributed over the thermoplastic surface, leaving a portion of the thermoplastic surface uncovered by the flake material.

After the paper leaves the last buffing roll 32 it has on it a thermoplastic film in its normal non-tacky solid state, which in turn has distributed essentially uniformly over its surface extremely small, metallic flakes positioned to achieve maximum bonding and to permit exposure of at least a portion (from about 2 to 90%) of the glossy, thermoplastic surface to which the metallic flakes are bonded.

In accordance with the teaching of Serial Number 839,582 after the metal flakes have been applied to the glossy, thermoplastic surface while it is in a normal, non-tacky, solid condition, heat is applied to convert at least the surface of the thermoplastic film into a highly viscous state which supports the metal particles. In FIG. 1 this heating is shown being accomplished in a fusion zone consisting of a series of heaters 36. These may be gas burners, infrared lamps or other sources of radiant energy which soften but do not liquefy the thermoplastic film.

After heating the thermoplastic film is reconverted to its normal, non-tacky, solid condition to give a film 37 which has permanently bonded to it the metallic flakes distributed to allow a portion of the thermoplastic film to be exposed. In order to speed the reconversion of the thermoplastic surface to its solid, non-tacky condition and to give an exceedingly shiny, brilliant film coating the paper is preferably exposed to chilling such as by passing over chilling rolls 40 and 41 which also serve as guide rolls. A further step in accordance with the teaching of the above-identified Serial Number 10,839 is that of supercalendering which is shown to be carried out by the supercalendering rolls 42, 43 and 44. Finally the finished coated paper substrate is wound on a collection roll 46.

Figure 5:
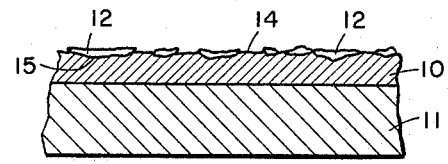
FIG. 5 is a cross-section of a substrate coated in accordance with the invention.

FIG. 5 is a much enlarged diagrammatic cross-section of the resulting coated substrate. In this figure a substrate 11 such as paper is coated with a continuous thermoplastic film 10 such as polyethylene or a polyamide. Permanently affixed to the upper surface of the thermoplastic film are aluminum flakes 12 joined to the film on their flat sides 15. Surrounding the flake material 12 there are exposed surfaces 14 which are the surfaces of the original thermoplastic material.

Figure 6:
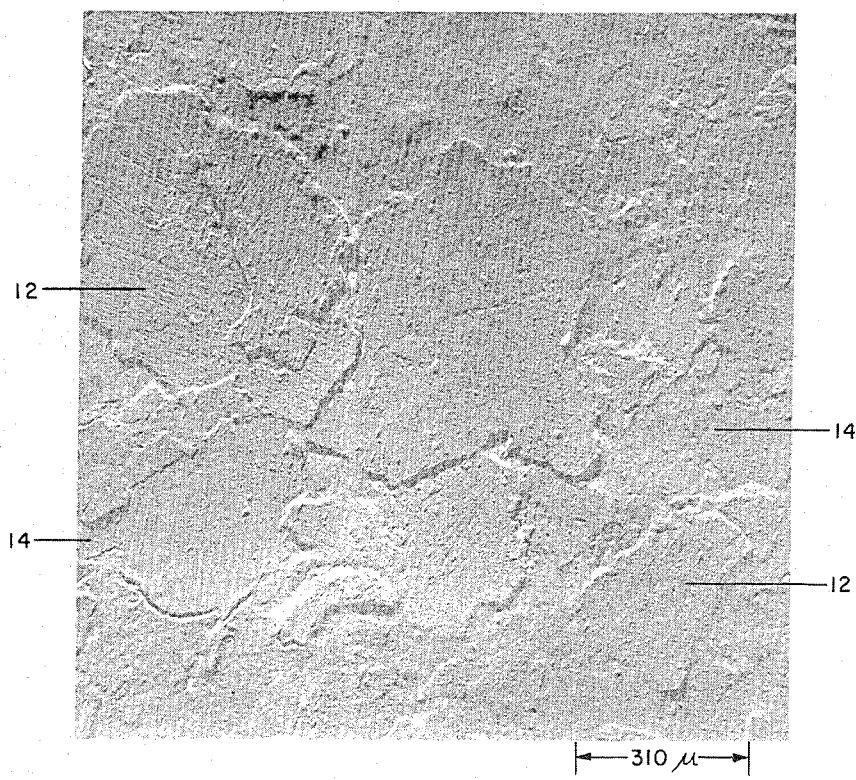
FIG. 6 is a photomicrograph (10,000 enlargement) of the coated surface.

The finished coated material can be clearly seen in the photomicrograph of FIG. 6. This is a positive replica and represents a magnification of 10,000. The aluminum flakes 12 are clearly visible as well as the uncovered portions 14 of the thermoplastic film. It will be seen that the flakes lie flat and it will be appreciated that the maximum extent of bonding is obtained in this arrangement. It will be also seen from FIG. 6 why there is essentially no rub-off of the flake material in a coating such as this for essentially all of the flakes are bonded over the maximum area possible.

The following example will further illustrate the method of this invention. It is, of course, not meant to be limiting. It was carried out in the apparatus illustrated. It will, of course, be appreciated that equivalent apparatus can be used so long as the quantity of flaked material deposited on the thermoplastic film surface is controlled and the deposition is accomplished in the manner required.

*Example I*

Aluminum flake (99.9% through 325-mesh and 98% through 400-mesh) having a leafing value of 75% was fed from a hopper into a feed channel of the type illustrated in FIG. 3. The screw in the feed channel was rotated, by an electric motor, at a speed of about 20 r.p.m. The feed rolls and printing rolls were operated at a speed to correspond to a forward speed of the glossy polyethylene-coated paper of about 400 feet per minute. The pick-up roll was rotated at a somewhat slower speed than the other rolls.

The buffing rolls were six inches in diameter and the forward buffing roll was operated at about 100 r.p.m. while the two after buffing rolls were run at about 1750 r.p.m. Conversion of the polyethylene film surface to the required highly viscous state was accomplished by means of infrared lamps and the chilling rolls were cooled with tap water circulating in them. Finally, calendering was done at 1500 pounds per inch of width while the calendering rolls were maintained at 180° F. The resulting coated paper had a brilliant metallic surface comparable to metal foil, and a structure such as that illustrated in FIG. 6.

Through the use of the feed channel and the series of pick-up rolls and the printer roll followed by the buffing rolls operated in the manner described it is possible to apply the extremely fine flaked material in the desired unique manner without using any carrier vehicle for the flaked material and without providing for removal of any excess material. This method and apparatus for applying the flaked material in turn makes it possible to provide a completely integrated, efficient and economical apparatus for applying to a substrate, e.g., paper, a brilliant shiny, highly polished metalized coating. Moreover, this completely integrated apparatus is capable of producing the metalized paper at rates comparable to those normally associated with standard coating techniques, for example at 300 to 500 feet per minute.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

Method of depositing finely-divided flake material onto a glossy, dry, nontacky, thermoplastic film surface, comprising the steps of:

(a) uniformly depositing a controlled amount of said finely-divided flake material onto a soft pickup roll;

(b) transferring said flake material to a printing roll;

(c) contacting said printing roll with said film surface thereby to apply said flake material uniformly over said film surface to the extent that from about 10 percent to about 98 percent of said film surface is covered; and (d) buffing the resulting flake-covered film by contacting said flake-covered film first with a soft surface moving in a direction opposite to the direction in which said film is moving and then with a soft surface moving in the same direction as said film whereby substantially all of the said flakes contact said film through their maximum surface area and form a single layer of flakes on said surface suitable for heat bonding thereto.

References Cited by the Examiner

UNITED STATES PATENTS

| 1,179,689 | 3/1916 | Weikel et al. | 118—109 X |
| 1,270,450 | 6/1918 | Shope | 117—16 |
| 1,539,512 | 5/1925 | Robinson | 117—31 |
| 1,924,994 | 8/1933 | Knapp | 118—118 X |
| 2,070,600 | 2/1937 | Jenett | 118—249 X |
| 2,332,221 | 10/1943 | Harshberger | 117—31 X |
| 2,360,443 | 10/1944 | Onions | 118—620 |
| 2,479,094 | 8/1949 | Bicknell | 117—31 X |
| 2,589,424 | 3/1952 | Netschert | 118—620 |

FOREIGN PATENTS 474,245 10/1937 Great Britain.

MURRAY KATZ, *Primary Examiner.*

RICHARD D. NEVIUS, M. KAPLAN,
J. P. McINTOSH, *Assistant Examiners.*